INVENTOR.
CHARLES D. PREUSCH
By John W. Linkhauer
Attorney

Feb. 10, 1970  C. D. PREUSCH  3,494,165
APPARATUS FOR FINISHING PIPE OR TUBING
Filed Sept. 10, 1968  2 Sheets-Sheet 2

INVENTOR.
CHARLES D. PREUSCH
By John W. Linkhauer
Attorney

United States Patent Office 3,494,165
Patented Feb. 10, 1970

3,494,165
APPARATUS FOR FINISHING PIPE
OR TUBING
Charles D. Preusch, Pittsburgh, Pa., assignor to
Crucible Inc., a corporation of Delaware
Continuation-in-part of application Ser. No. 589,292,
Oct. 25, 1966. This application Sept. 10, 1968, Ser.
No. 767,894
Int. Cl. B21b 17/04, 19/16
U.S. Cl. 72—193                           12 Claims

ABSTRACT OF THE DISCLOSURE

This invention relates to apparatus for removing the internal weld bead from welded tubing while in longitudinal movement. The apparatus comprises a plug that is biased in a direction opposite that of tubing movement. Reciprocating movement is imparted to the plug by sequentially applying a compressive force to the tubing over an external surface area adjacent the plug by the use of a roll stand. This movement of the plug results in removal of the weld bead.

---

Figure 1A:
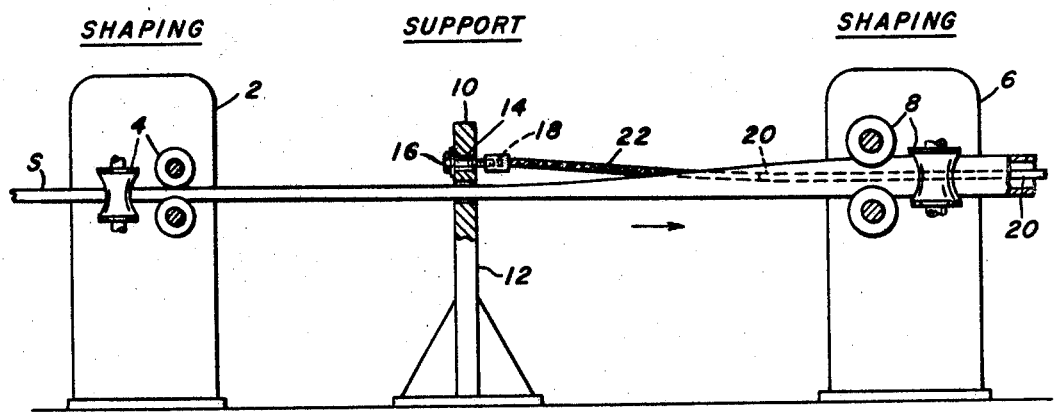

This is a continuation-in-part of my copending patent application Ser. No. 589,292 filed on Oct. 25, 1966, now abandoned.

Welded pipe and tubing are conventionally produced by a welding operation wherein the edges of shaped skelp are joined to form the pipe or tubing. It is usual for the welding operation to leave a weld bead that extends inwardly about 0.005 inch from the interior wall of the pipe or tube being formed. With some welding techniques, a still larger weld bead is obtained; for example, the plasma welding process gives a weld bead of 0.015 inch. It is necessary, in order for the pipe or tube to meet the standards of commercial salability, that this weld bead be removed, or at least worked down so that the interior of the pipe presents a smooth surface.

There are known methods and apparatus for removing the weld bead, but each of these has disadvantages in comparison with that of the present invention, and this is especially true with respect to pipe or tubing of relatively small diameter (under 1.5 inches O.D.). With tubing of relatively large diameter (over 1.5 inches O.D.), it is possible to remove the weld bead by providing a rotating mandrel within the pipe or tubing in the pipe-welding line downstream of the welding head. The mandrel has an exterior diameter of slightly less than the desired inside diameter of the pipe or tubing and supports two or more small rotatable members of heat-resistant material that bears against the weld bead and work it down. This approach is not practical with pipe or tubing of smaller sizes. Such smaller pipe or tubing is generally welded at higher line speed, so that the speed of rotation of the mandrel would need to be increased in order to obtain a finish of the same quality. At the same time, it becomes necessary to decrease the diameter of the shaft (which may, for example, be 20 feet long) used to drive the mandrel. The strength of the shaft is proportional to its cross-sectional area; a shaft one-third as large in diameter has about only one-ninth as much strength.

For reasons indicated above, it has been necessary before the present invention to remove the weld bead from pipe or tubing of relatively small diameter by a separate operation conducted elsewhere than on the welding line. As it is impractical to heat the pipe or tube again, this means that the weld bead is worked on while it is cold and, consequently, harder to remove. Rotary swaging is one known method; repeated cold drawing (for example, about three times) is another. Both these methods are expensive (on the order of $7 to $10 per 100 lineal feet) and leave something to be desired in the quality of the finish obtained.

Accordingly, it is an object of the present invention to provide apparatus for finishing pipe or tubing of relatively small diameter better and at considerably lower cost, without resort to a separate operation conducted away from the welding line.

Figure 1B:
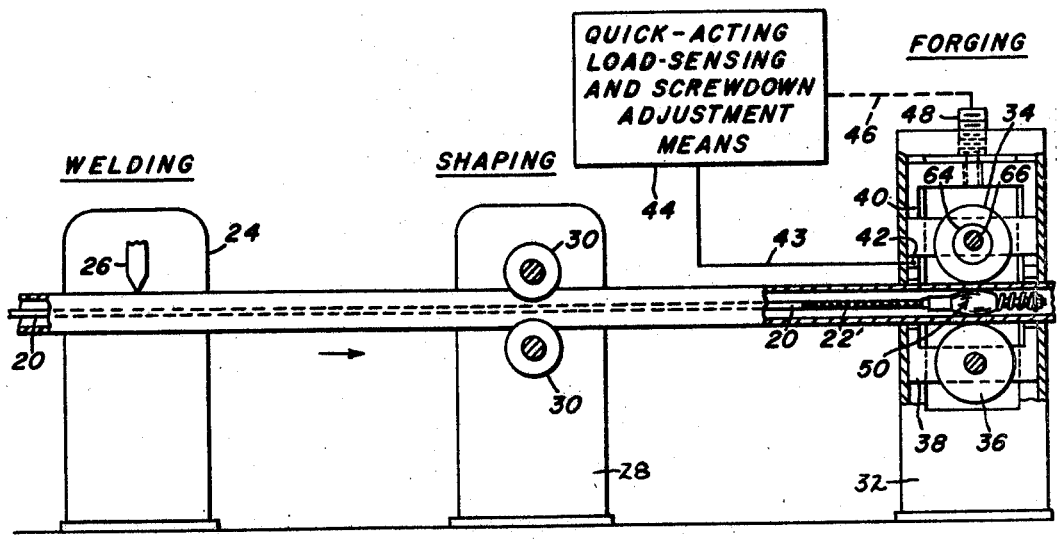
Figure 2:
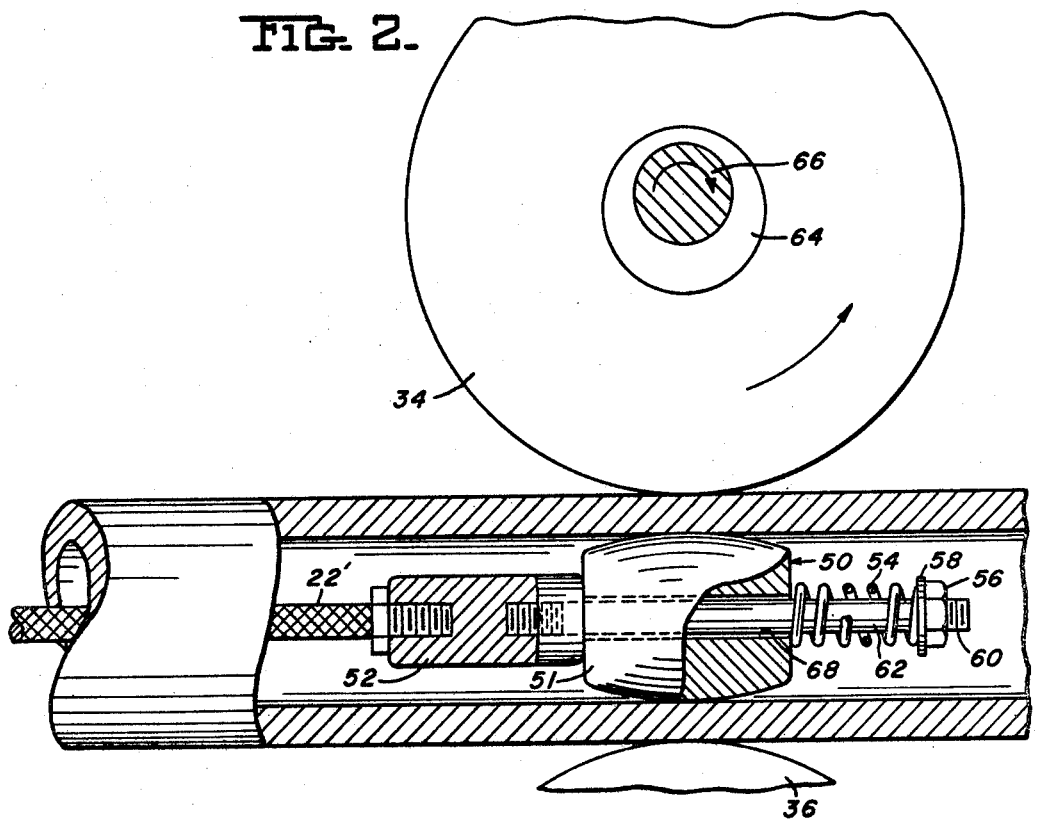
Figure 3:
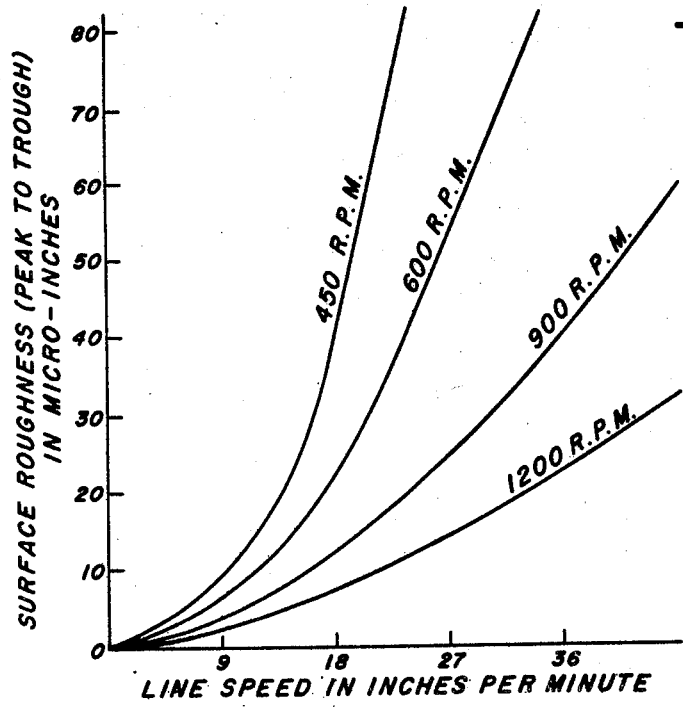

This and other objects of the invention will be apparent to those skilled in the art from the description which follows, taken together with the accompanying drawings, in which:

FIGURES 1A and 1B comprise an elevation view, partly diagrammatic and partly in section, of a pipe welding line provided with equipment in accordance with my invention;

FIGURE 2 is an enlarged and more detailed view of a part of the apparatus shown in FIGURE 1B; and FIGURE 3 is a graph indicating the influence of the line speed and another parameter hereinafter more fully explained upon the fineness of the finish produced by equipment in accordance with my invention.

In brief summary, the present invention comprises, in combination with a welding line, a plug of rigid construction located axially within the pipe or tubing being formed and having a diameter portion in contact with the internal weld bead and the opposite internal surface of the pipe or tubing. Means outside the pipe are provided for sequentially applying a compressive force at high frequency and with controlled maximum severity over an external surface area of the pipe or tubing adjacent the plug. This moves the plug axially within the pipe a short distance and it is then released. Means are provided for returning the plug to its original position before the onset of the next squeezing action. More specifically, the preferred means for sequentially providing a compressive force comprises a roll or shaft mounted eccentrically outside the pipe or tube, bearing upon its exterior and capable of being revolved at about 200 to 1000 revolutions per minute. It is important that the maximum severity of the compressive force or squeezing action be controlled to prevent the failure of the bearings for the eccentrically mounted roll or shaft or the cracking of the product at the weld, and this problem of the variability of the force applied in the squeezing action is complicated by the variations in the wall thickness of the pipe or tubing formed as well as variations in the height of the weld bead. It has further been discovered that, although satisfactory results can be obtained simply with an eccentrically mounted roll, it is preferable to use a roll journaled for free rotation about an eccentrically driven shaft. This arrangement has been found to provide optimum plug reciprocation. With this apparatus, in accordance with this invention, it is possible, for example, to remove a weld bead of 0.005 inch from the interior of a pipe 1.030 inch in outside diameter with an 0.109 inch wall while it passes through a welding line at a rate of about 10 to 90 inches per minute, and to do so not only at substantially lower cost than with the means known before the present invention, but also with a better result, the surface roughness (peak to trough) not exceeding 100 microinches.

Referring more particularly to the drawings, FIGURES 1A and 1B show schematically a welding line wherein skelp S is shaped to form a round, welded, finished, and subsequently processed in accordance with known and conventional procedures. It will be understood that the drawing is not to scale and that the shaping of the pipe is customarily done with the use of several roll stands, rather than the small number shown. The conventional equipment for cutting the pipe or tubing to desired lengths after it has been welded is also not shown.

As shown in FIGURE 1A, skelp S is partly shaped in one or more stands 2 and 6 having rolls 4 and 8. Between two of the stands in the part of the welding line at which the pipe or tubing is not closed over, there is provided a support 10 comprising an upright portion 12 having therein an opening 14 to permit the passage of a bolt 16 having at 18 a threaded portion to permit its being connected to a hanger rod 20 by means of a flexible and extensible connection 22. After the pipe or tubing is closed over, as by the operation of one or more stands such as stand 6, the pipe is welded at stand 24 by means of an electrode indicated schematically at 26. Preferably the pipe or tubing is then further shaped to roundness at another stand 28 as by rolls 30. The work is then passed to a stand 32, whereat the weld bead is removed by the operation of rolls 34 and 36 in cooperation with a plug assembly 50, to be hereinafter more fully described. Rolls 34 and 36 are set in chocks 40 and 38, respectively, between which there is provided one or more load cells 42 capable of sensing the maximum roll-separating force in the roll stand 32. Forces sensed by cell 42 are passed by line 43 to a quick-acting load-sensing and screwdown adjustment means 44, which may constitute any of several kinds of automatic control circuit, well known to those skilled in the art. The output of means 44 comprises an adjustment, as by a linkage indicated schematically at 46, to the screwdown 48 of the stand 32. The above-mentioned assembly 50 comprises, most importantly, a plug 51, preferably generally barrel-shaped and made of a material, such as tungsten carbide powder cemented with cobalt, that will resist wear at the high use temperatures involved and will resist the tendency to pick up the weld-bead material. In addition, the plug must resist compression upon application of compressive force to the pipe or tubing and thus remain substantially rigid during the operation. The maximum exterior diameter of the plug 51 approaches the free internal diameter of the pipe or tubing to be finished. The plug 51 is secured to hanger rod 20, for example, by means of an internally threaded stop 52 and flexible cable 22. Plug 51 is provided with an internal bore 68 to permit the passage of a threaded shaft 60 bearing a nut 56, washer 58, and spring 54 compressed to urge plug 51 toward stop 52. This connection of the plug to hanger rod 22 by means of the flexible cable serves to bias the plug against movement in the direction of tubing movement. Stand 32 differs from that customarily used in that its upper work roll 34 is journaled for free rotation about a cylindrical member 64 that is eccentrically driven through a shaft indicated schematically at 66. It is preferred that, while the work roll 34 turns in the same direction as the work, the eccentric shaft turns in the opposite direction, as indicated in FIGURE 2. In any event, however, the surface of the upper work roll rotates in eccentric contact with the tubing exterior.

FIGURE 3 shows the calculated fineness of the finish obtained at various line speeds, using work roll 34 of 5 inches in radius, the curves being based upon the equation $$h = R - R^2 - \frac{v^2}{2w}$$

where $h$ = surface roughness, peak to trough
$R$ = work roll radius
$v$ = line speed, and
$w$ = speed of rotation of shaft 66.

The observed results are consonant with the theoretical. It is thus easily possible at good line speeds to reduce a weld bead from 0.020 in. to 0.0001 in. or less.

While I have shown and described herein a certain embodiment of my invention, I intend to cover as well any change or modification therein which may be made without departing from the spirit and scope of the invention.

What is claimed is:

1. Apparataus for removing an internal weld bead from longitudinally welded metal tubing during longitudinal movement thereof comprising a plug positioned axially within said tubing and having a diameter portion thereof in simultaneous contact with said weld bead and an opposite internal surface area of said tubing, means exterior of said tubing for moving said plug axially with said tubing movement by sequentially applying a compressive force to said tubing over an external surface area adjacent said plug, means for returning said plug axially to its original position upon release of said compressive force, whereby said internal weld bead is removed by axial reciprocation of said plug.

2. The apparatus of claim 1 wherein said plug is constructed from a material that resists compression and remains rigid upon application of said compressive force.

3. The apparatus of claim 2 wherein said plug is constructed from a material that resists pickup of weld-bead material.

4. The apparatus of claim 3 wherein said plug is constructed from tungsten-carbide powder.

5. The apparatus of claim 1 wherein said plug is generally barrel shaped.

6. The apparatus of claim 1 wherein said means exterior of said tubing for moving said plug comprises a roll stand having a roll rotating in the direction of tubing movement with an exterior surface in rotating, eccentric contact with said external tubing surface area.

7. The apparatus of claim 6 wherein said roll is journaled for rotation about an eccentrically driven shaft.

8. The apparatus of claim 6 wherein said roll has an eccentric circumference.

9. The apparatus of claim 1 wherein said means for returning said plug comprises means biasing said plug against movement in the direction of said tubing movement.

10. The apparatus of claim 9 wherein said biasing means comprises an elongated, extensible connection fastened at one end to an end of said plug opposite that of the direction of tubing movement and at the other end to a fixed anchor.

11. The apparatus of claim 1 wherein means are provided for controlling the severity of said compressive force.

12. Apparatus for removing an internal weld bead from longitudinally welded metal tubing during longitudinal movement thereof comprising a plug positioned axially within said tubing and having a diameter portion thereof in simultaneous contact with said weld bead and an opposite internal surface area of said tubing, a roll stand having a roll rotating in the direction of tubing movement with an exterior surface in rotating, eccentric contact to move said plug axially with said tubing movement by sequentially applying a compressive force to said tubing over an external surface area adjacent said plug and an elongated, extensible connection fastened at one end to an end of said plug opposite that of the direction of tubing movement and at the other end to a fixed anchor for returning said plug axially to its original position upon removal of said compressive force, whereby said internal weld bead is removed by axial reciprocation of said plug.

References Cited

UNITED STATES PATENTS

| 1,215,773 | 2/1917 | Butcher | 29—481 |
| 1,884,467 | 10/1932 | Windsor | 90—24 |
| 2,600,254 | 6/1952 | Lysobey | 72—198 |
| 2,712,249 | 7/1955 | Siegerist | 29—481 |

LOWELL A. LARSON, Primary Examiner

U.S. Cl. X.R.

29—481; 72—370; 90—24